Nov. 1, 1932.  A. A. KRAMER  1,886,197
SEMITRAILER TANK VEHICLE
Filed May 13, 1930  5 Sheets-Sheet 1
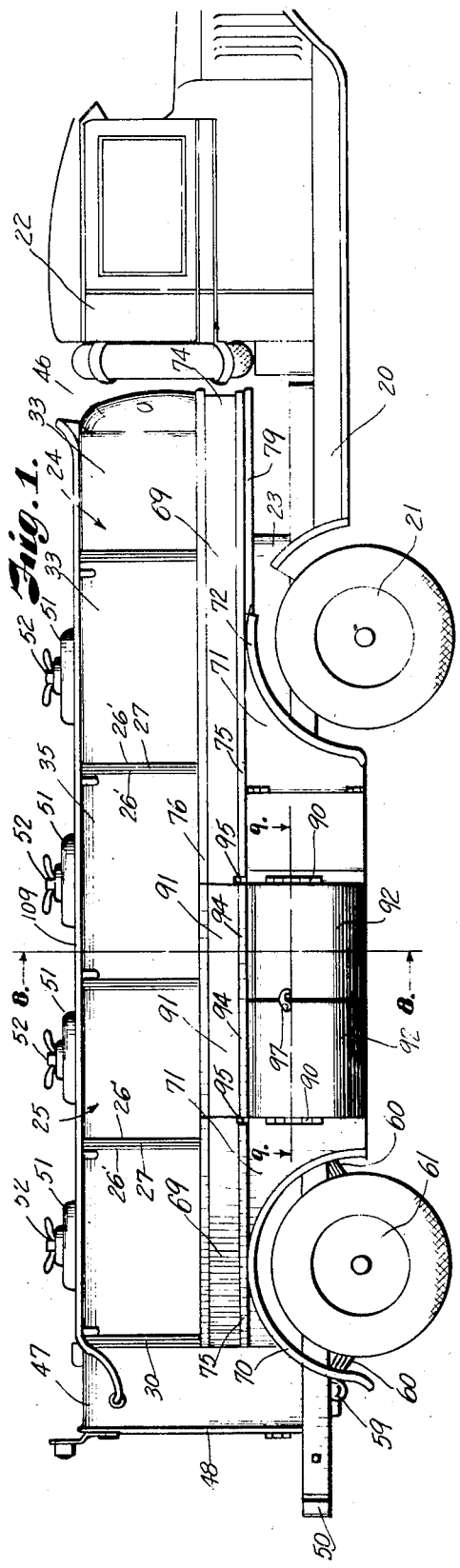
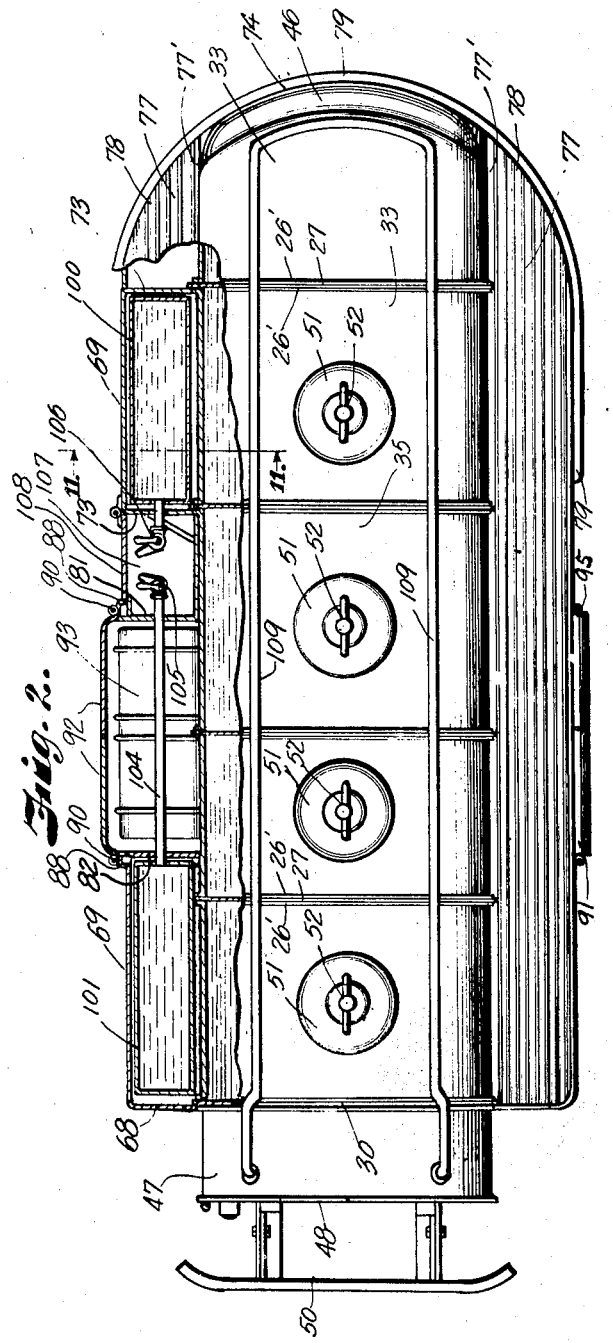
INVENTOR.
Andrew A. Kramer
BY Alfred R. Fuchs
ATTORNEY.

Nov. 1, 1932. A. A. KRAMER 1,886,197
SEMITRAILER TANK VEHICLE
Filed May 13, 1930 5 Sheets-Sheet 2
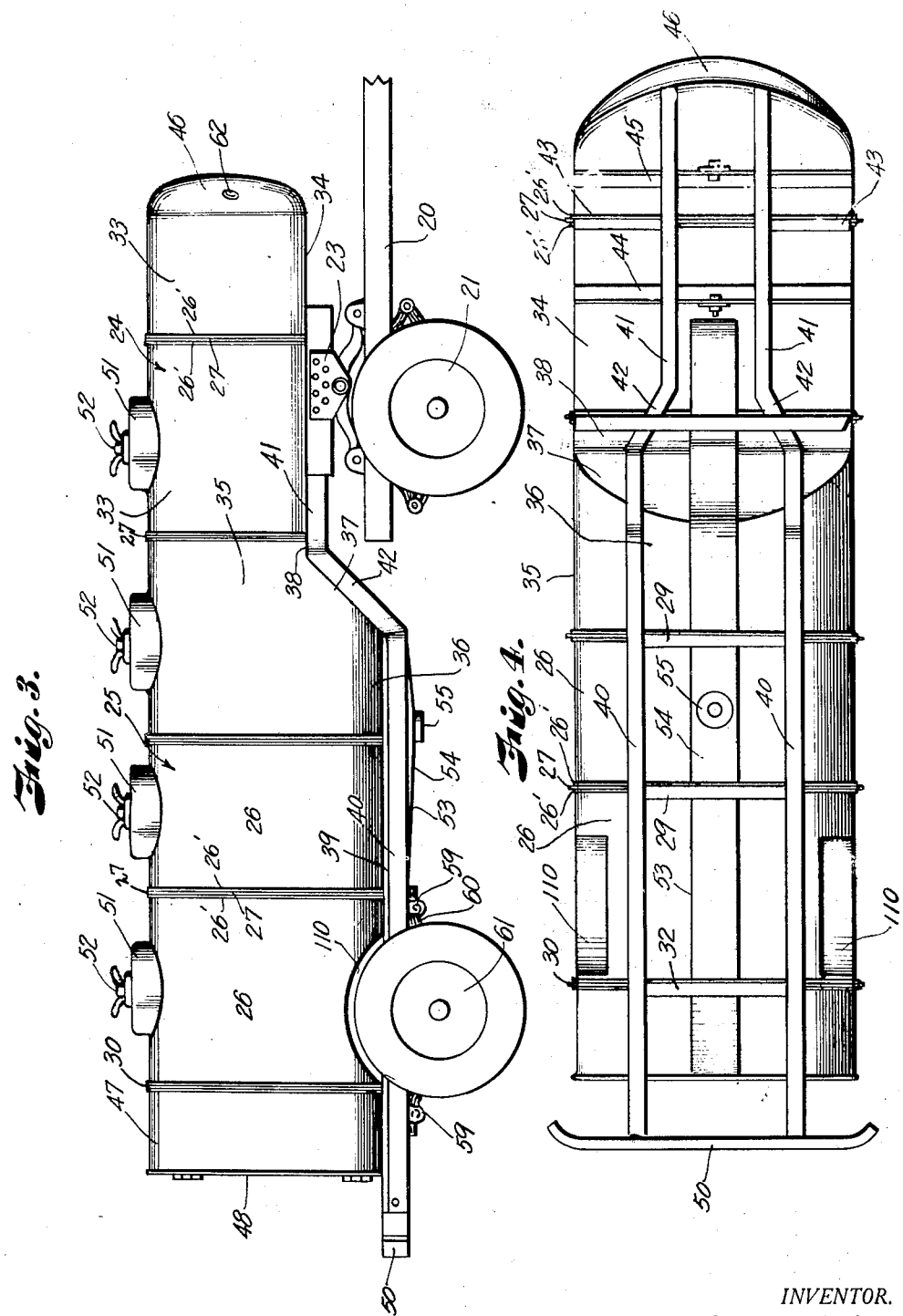
INVENTOR.
Andrew A. Kramer
BY Alfred R. Fuchs
ATTORNEY.

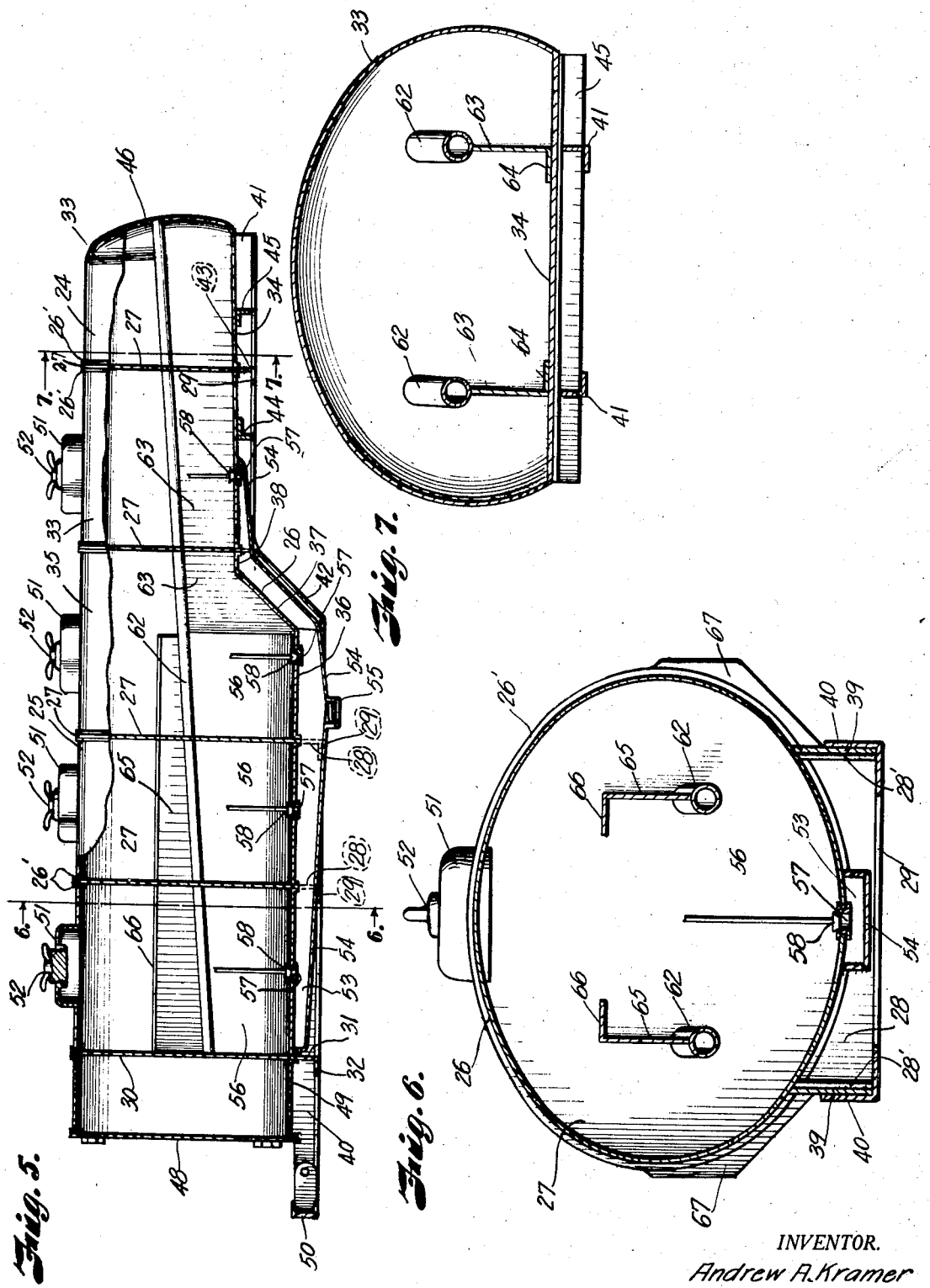

Nov. 1, 1932.    A. A. KRAMER    1,886,197
SEMITRAILER TANK VEHICLE
Filed May 13, 1930    5 Sheets-Sheet 4
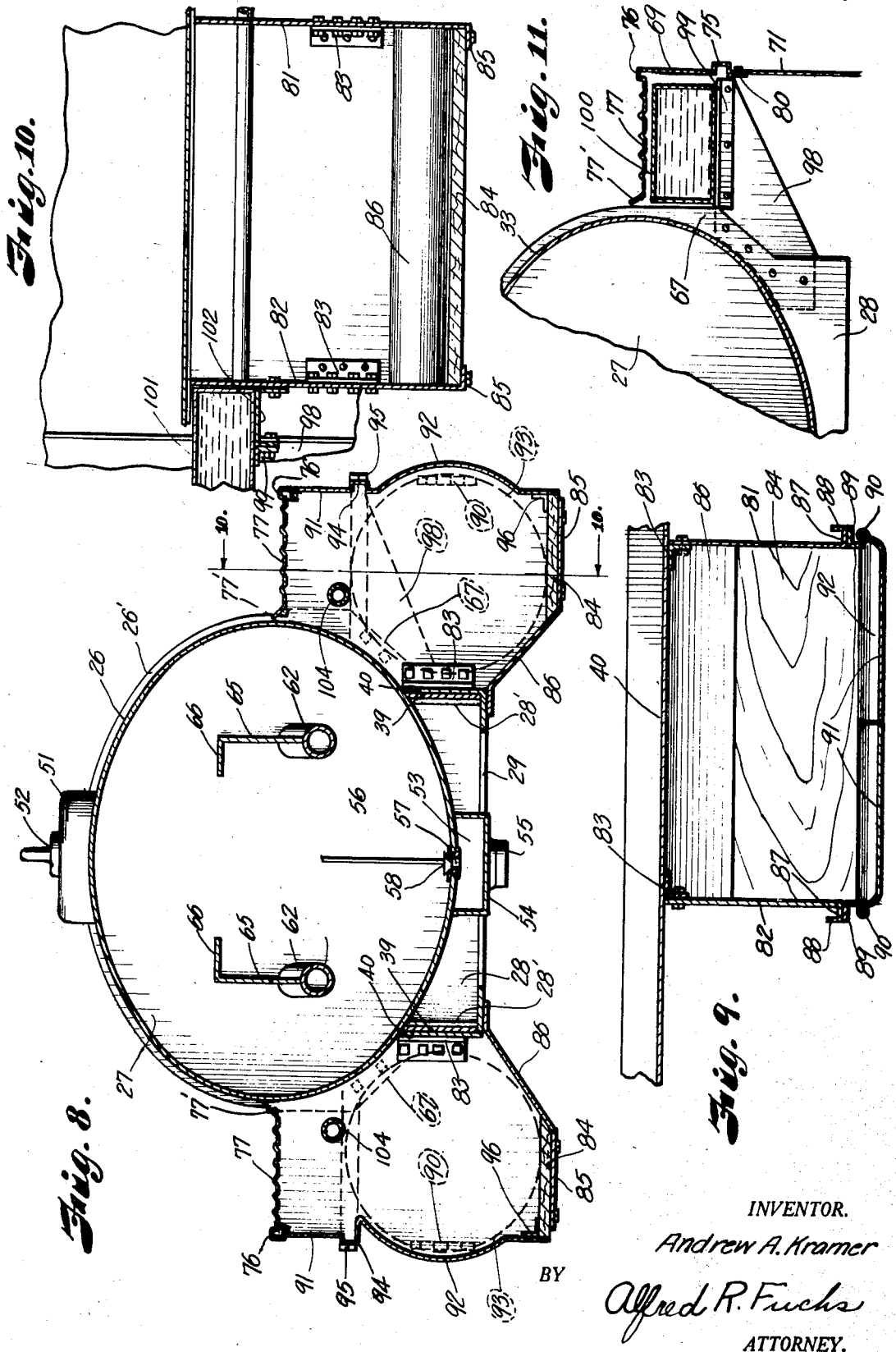
INVENTOR.
Andrew A. Kramer
BY
Alfred R. Fuchs
ATTORNEY.

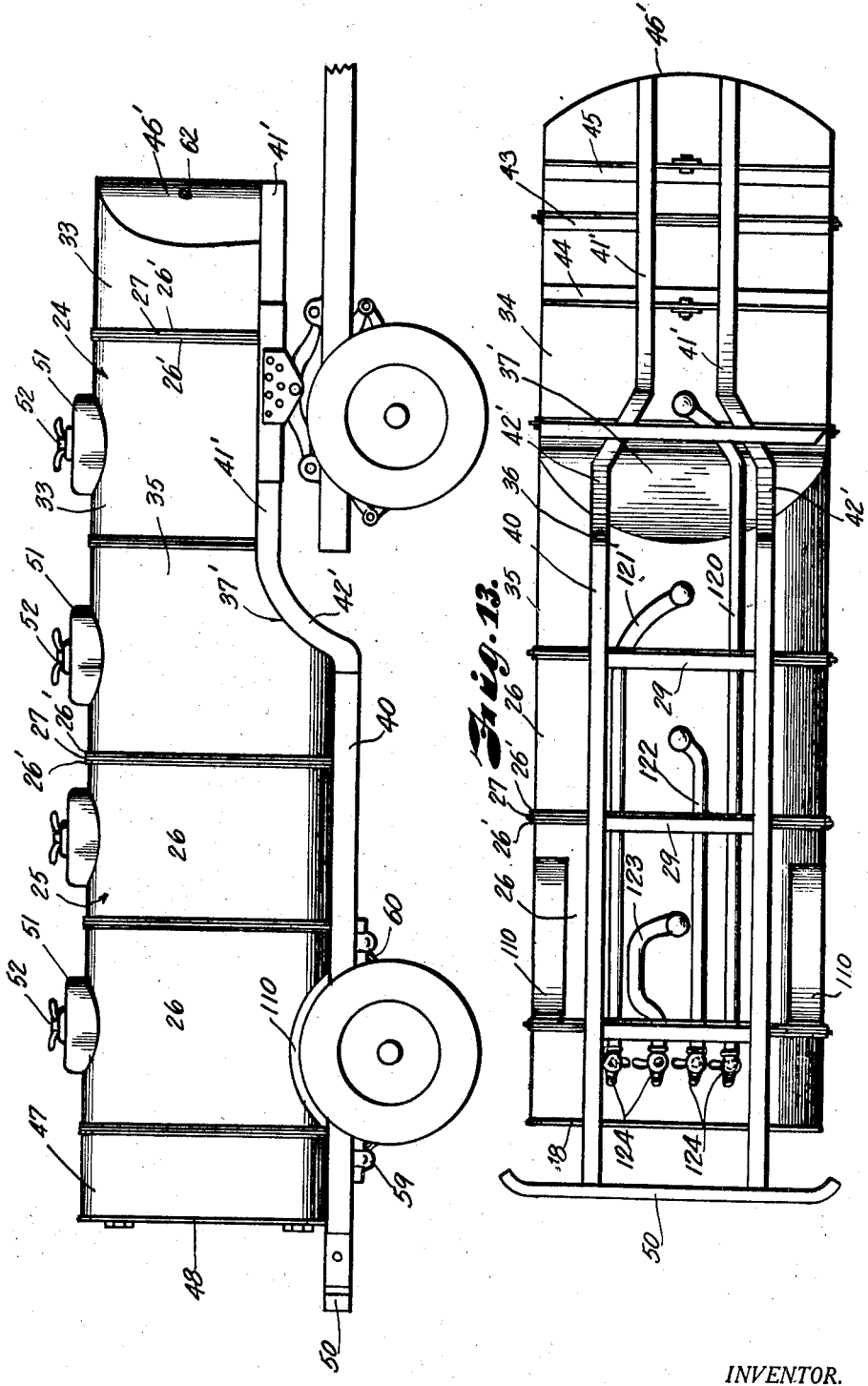

Patented Nov. 1, 1932

1,886,197

UNITED STATES PATENT OFFICE

ANDREW A. KRAMER, OF KANSAS CITY, MISSOURI

SEMITRAILER TANK VEHICLE

Application filed May 13, 1930. Serial No. 451,978.

My invention relates to tank vehicles and more particularly to a semi-trailer tank vehicle.

It is a purpose of my invention to provide a tank vehicle of the above mentioned character comprising a vehicle tank so made as to obtain a low center of gravity for the tank and contents and to obtain a minimum over-all length for the vehicle with such low center of gravity. In order to obtain this low center of gravity the vehicle tank is provided with a cut away portion at the forward end thereof adapted to rest on the pulling vehicle, thus providing an offset tank body for the vehicle. In order to reduce the over-all length of the pulling vehicle and the semi-trailer tank vehicle, the forward end of the semi-trailer tank vehicle is rounded so that the same will be able to be turned about the vertical axis of the fifth wheel structure for supporting the same to any angle that may be necessary in practice without approaching the cab of the pulling vehicle any closer than when the semi-trailer tank is in longitudinal alignment with the longitudinal axis of said pulling vehicle.

It is a further purpose of my invention to provide a semi-trailer tank vehicle of such a character that the same will have a good appearance and at the same time be of high efficiency and will be easily kept clean. This is accomplished by providing a skirting for the semi-trailer tank and this skirting, preferably has receptacles within the same, such as lubricant tanks and barrel receptacles.

It is another purpose of my invention to provide a housing or skirting of the above mentioned character that is so constructed that the upper portion thereof serves as a running board extending along opposite sides of the tank vehicle, and my invention further relates to new and improved means for securing such a skirting to the vehicle tank and new and improved means for mounting the lubricant tanks and other receptacles within the confines of said skirting or housing.

It is a further purpose of my invention to provide a new and improved barrel receptacle for my improved tank vehicle that occupies a minimum of space and yet enables the barrel to be completely enclosed within the same.

It is a further purpose of my invention to provide a vehicle tank that is provided with a curved head portion at the forward end thereof, and which may be curved in more than one direction to obtain a bulged head portion at said forward end of said tank.

It is still another purpose of my invention to provide new and improved bracing means and supporting means for my improved vehicle tank whereby the same is adapted to support its own weight and the contents thereof without a separate vehicle frame being necessary.

Other objects and advantages of my invention will appear as the description of the drawings proceeds. I desire to have it understood, however, that I do not intend to limit myself to the particular details shown or described, but that I intend to include as part of my invention all such obvious changes and modifications as would occur to a person skilled in this art, and as would fall within the scope of the claims.

In the drawings:

Fig. 1 is a side elevation of my improved semi-trailer tank vehicle with a portion of the pulling vehicle shown in conjunction therewith.

Fig. 2 is a plan view thereof partly broken away.

Fig. 3 is a view similar to Fig. 1, showing the semi-trailer tank with the skirting and parts carried within the same omitted.

Fig. 4 is a bottom plan view of the vehicle tank alone.

Fig. 5 is a view partly in elevation and partly in section of my improved vehicle tank.

Fig. 6 is a section taken on the line 6—6 of Fig. 5 on an enlarged scale.

Fig. 7 is a similar view taken on the line 7—7 of Fig. 5.

Fig. 8 is a section taken on the line 8—8 of Fig. 1.

Fig. 9 is a fragmentary horizontal section through the barrel carrier and adjoining parts.

Fig. 10 is a section taken on the line 10—10 of Fig. 8.

Fig. 11 is a fragmentary section taken on the line 11—11 of Fig. 2.

Fig. 12 is a view similar to Fig. 3 of a modification and

Fig. 13 is a view similar to Fig. 4 of the form shown in Fig. 12.

Referring in detail to the drawings, my improved tank vehicle is shown in Figs. 1 and 3 of the drawings as being used in conjunction with a pulling vehicle 20, having the rear wheels 21, and being provided with a cab 22. The tank vehicle is made in the form of a semi-trailer, the forward end of which is mounted on any suitable form of fifth wheel structure 23, shown more in detail in Fig. 3. The tank vehicle comprises a tank, which is provided with a reduced forward end portion 24 and a main body portion 25 providing an offset in the under side of said tank. The body of the tank is shown more in detail in Figs. 3, 4, 5, 6 and 7, and the main body portion 25 of the tank is shown in cross-section in Fig. 6, and it will be seen that the same is made up of curved sheets or shell portions 26 that are of a generally elliptical form with the longest axis thereof extending substantially horizontally.

The tank is provided with transverse vertical partition sheets 27, which are welded to the outwardly flanged edges 26' of the shell portions 26, and which have downward extensions 28 that form transverse bracing or frame members underlying the tank, the same preferably having end flanges 28' and bottom flanges 29 thereon. The rear head 30 of the tank is made in a similar manner and is provided with an extension 31 underlying the tank and having a flange 32 thereon. The forward reduced end portion of the tank is shown in cross-section in Fig. 7, and comprises curved sheets or shell portions 33 that are partially elliptical in cross-section and are of a curvature corresponding to that of the main body portion 25. Said shell portions 33, however, are each provided with a flat bottom portion 34, the partitions 27 being secured to said flat bottom portions 34 and to the curved portions 33 of the shell portion in a similar manner to that previously described. The shell portion 35, which is located at the offset in the tank has a curved bottom portion 36 corresponding to the curvature of the bottom part of the shell portion 26, an inclined shell portion 37 and a flat bottom portion 38 similar to the bottom portion 34, this section being flanged and welded to the partitions 27 in a similar manner to that previously described.

The tank body constructed as described above has the longitudinally extending bracing members 39 extending lengthwise thereof, said bracing members 39 being secured to the shell portion 26 at their upper ends by welding and being also welded to the transversely extending bracing members 28, and terminating at the point where the inclined portion 37 joins the curved bottom portion of the shell 35. Reinforcing angles 40 are also preferably provided, the same being welded to the transverse bracing members 28 and longitudinal bracing members 39. The angle members 40 are straight extending substantially as far forward as the members 39. Similar angle members 41 are provided that have inclined portions 42 and upper straight portions extending to the forward end of the tank, as will be evident from Figs. 3 and 4, the members 40 and 41 being overlapped where the same join and are welded together.

The transverse bracing member 31 is also welded to the longitudinal members 39 and the angle members 40. The forward end of the tank has a pair of transverse angles 44 and 45 welded to the bottom 34 thereof, and to the longitudinal members 41, the angles 44 and 45 serving as a means for connecting the fifth wheel structure 23 to the tank body, the extension 43 of the forward partition 27 is cut away between the angles 41, but is welded to the outer sides of the angles 41.

The forward head 46 of the tank body is curved both transversely and vertically to provide a bulged head portion that is curved in all directions, providing a strong stiff head in said tank at the forward end thereof, and also making it possible to place the tank body in such a position that it will be much closer to the cab 22 than would be otherwise possible. This is accomplished because the transverse curvature of the head 46 is substantially about a center lying on the vertical axis of the fifth wheel structure 23, whereby the front end of the tank is spaced substantially the same distance from the cab 22 for all angular positions of the trailer relative to the pulling vehicle that would be assumed in practical use.

The rear end of the tank may have a bucket box provided thereon having a shell portion 47 of any desired shape secured to the rear head 30, and having a rear wall provided with doors 48 as is customary, and having a bottom 49. A bumper 50 may be pivotally mounted on the rear ends of the longitudinal bracing members 39, if desired.

The tank is provided with the domes 51 having the filler plugs 52, and is also shown as being provided with a discharge manifold 53 that is welded to the under side of the tank and has a bottom 54 inclined toward the discharge connection 55, said manifold being offset to conform to the offset in the bottom of the tank. The compartments 56 of the tank are provided with discharge openings 57 in the bottoms thereof communicating with the manifold and controlled by the valves 58.

The longitudinal members of the bracing structure under said tank have the spring shackles 59 secured thereto, and the springs 60 are mounted between said members and the axle carrying the rear trailer wheels 61.

The tank body is preferably provided with longitudinal tubular bracing members 62, which are welded into the heads 30 and 46, and which may be open on the ends to serve as hose receptacles. These preferably are inclined to bring the rear ends thereof into a position whereby access may be readily had to the same, but are made straight from end to end so that the hose can be more readily removed from and put into the same, and also to give the maximum bracing effect longitudinally of the tank. The bracing members are provided with stiffening members having substantially vertical web portions 63 welded to said tubular members 62, and having flanges 64 welded to the shell portion of the tank, and with stiffening members having the substantially vertical web portions 65 welded to the tubular members 62 and having flanges 66 at the tops thereof.

The tubular members 62, the web portions 63 and 65 and the flanges 64 and 66 are also welded to the partition sheets 27, and said web portions 63 and flanges 64 are welded to the head 46 while the web portions 65 and flanges 66 are welded to the head 30. Thus a tank body, transversely and longitudinally braced both internally and externally is provided, and the bracing means are integral with the tank.

The partition sheets 27 not only have the downward extensions 28, and the head 30 does not only have the downward extension 31, but these also have laterally extending portions 67 that form lateral flanges on the tank body for the attachment of other parts thereto. The rear transversely extending portion 68 of a skirting 69 is secured to said flanges 67 on the head 30, said skirting extending along opposite sides of the tank and comprising detachable portions 71 having curved cut out portions above the wheels 61, the mud guards 70 being welded thereto. Curved edges are also provided on the detachable portion of said skirting above the wheels 21 of the pulling vehicle and have the mud guards 72 welded thereto. The skirting also has the transverse portions 73 welded thereto, these being attached to the flanges on a pair of the partitions 27. The skirting has a forward rounded end 74 corresponding to the curvature of the head 46, and is also preferably provided with a bead 75 and a bead 76 for the sake of appearance. From the bead 76 the corrugated running board 77 preferably extends horizontally toward the tank body, and has an upwardly inclined inner edge portion 77' engaging the tank to deflect water away from the tank, said running board being preferably integral with said skirting. The front end thereof is rounded off at 78. The skirting is preferably provided with a depending angle member 79 running around the rounded forward end of the tank and extending back to the member 71.

The detachable portions 71 of the skirting are bolted to the flange 80 depending below the bead 75, said bead hiding the top edges of the portions 71 and ordinarily obscuring the bolts due to the fact that the bead 75 is below the plane of the eyes of an observer. The partitions 81 and 82 under the running board, are secured to the member 40 by means of the angles 83 and form the side walls of a barrel carrier or compartment having a bottom 84 secured to the flanges 85 on the members 81 and 82. Said barrel carrier also has a slanting bottom portion 86 welded to the horizontal flange of the angle 40 and integral with the flanges 85. The walls 81 and 82 have lateral flanges 87 thereon terminating in inturned flanges 88. Secured to the flanges 87 are angles 89 which carry the hinges 90, offsetting the same to provide for the proper hinging of the doors 91, which have the outwardly curved portions 92 to accommodate a barrel or drum 93 within said barrel carrier with the doors 91 completely closed. The doors are also provided with beads 94 aligning with the beads 75 on the skirting for purposes of appearance, and with the hinges 95 at said beads 94. Stop flanges 96 for the doors are provided on the bottom 84, said doors being held closed by means of any suitable latch 97.

Angle brackets 98 are secured to the flanges 67 on the tank, which are extensions of the partitions and heads of the tank, and these have bolted thereto the angles 99 welded to the bottom of the supplemental tank 100, there being one tank 100 on each side of the main body portion of the vehicle. The supplemental tanks 100 serve as lubricant tanks, ordinarily.

The supplemental tanks 101 are mounted in a similar manner at their rear ends, but the forward ends thereof are mounted in a slightly different manner, being provided with channels 102 welded to the bottoms thereof and bolted to the bracket 98 and to the wall 82.

A discharge pipe 104 extends from each tank 101, said pipes being provided respectively with the faucets 105 and 106 on the discharge ends thereof located in a compartment 107 on each side of the vehicle and having a door 108 forming part of the skirting extending around the main tank body. The tank may also be provided with a hand rail 109, if desired. On large size tanks the rear shell section may be provided with cut out portions 110 to accommodate the wheels 61.

Instead of making the head of the tank at the forward end thereof curved in all directions, it may be curved about a vertical axis only as shown in Figs. 12 and 13, in which the head is indicated by the numeral 46'. In the form of the invention shown in Figs. 12 and 13 the tank is provided with a curved portion 37' corresponding to the inclined portion 37 in the form previously described, and the angle member 41' is provided with a curved portion 42' corresponding to the curvature of the portion 37'. This curved form of the offset in the tank provides a structure of better appearance and of greater strength than that shown in the form previously described. In this form of the invention instead of providing a tunnel-like member for the discharge of the contents of the tank, separate drain pipes 120, 121, 122, and 123 are provided each leading from one of the compartments of the tank or to any other portion thereof desired, where the same can be conveniently reached to operate the faucets usually provided thereon, said faucets being indicated by the numeral 124. The discharge pipes 120, 121, 122 and 123 extend through the downward extensions of the partitions and are welded thereto, the same conforming substantially to the contour of the bottom of the tank, the other parts being similar to and indicated by the same numerals as in Figs. 1 to 11 inclusive.

Having thus described my invention, what I claim and desire to secure by United States Letters Patent is:—

1. In a trailer tank vehicle, a tank body having a reduced end portion provided with a rounded end wall and an upright skirting on said tank having a corresponding rounded end portion thereon.

2. In a tank vehicle, a tank body, a skirting depending from said body in spaced relation to the lower portion thereof and a supplemental tank mounted on said vehicle between said tank body and said skirting.

3. In a tank vehicle, a tank body, a skirting depending from said body in spaced relation to the lower portion thereof, a running board extending from said body to said skirting and a barrel carrier within said skirting under said running board.

4. In a tank vehicle, a tank body, a skirting depending from said body in spaced relation to the lower portion thereof and a barrel carrier within said skirting, said barrel carrier having doors provided with outwardly bulged portions forming a portion of said skirting.

5. In a tank vehicle, a tank body, a skirting on said vehicle spaced from said body, a supplemental tank mounted on said vehicle between said tank body and said skirting, a compartment between said skirting and said tank body, a discharge pipe leading from said supplemental tank to said compartment and a faucet on said pipe in said compartment.

6. In a tank vehicle, a tank body, a skirting on said vehicle, a supplemental tank and means for detachably mounting the same between said skirting and said tank body.

7. In a tank vehicle, a tank body, a skirting on said vehicle, a supplemental tank and means for detachably mounting the same between said skirting and said tank body, said means comprising brackets on said tank body and means on said supplemental tanks detachably secured to said brackets.

8. In a tank vehicle spaced wheeled supports, and tank body having front and rear heads and an upward offset in the under side thereof, spaced from the forward end thereof to provide a reduced forward end portion on said tank body having the bottom thereof elevated, and longitudinal bracing means for said tank comprising straight tubular members mounted in said tank body and inclined downwardly from the front to the rear end of said tank body and secured in the front and rear heads thereof and web portions connecting said tubular members with said bottom, said tubular members being inclined so as to locate the portions thereof in said reduced forward end approximately as far from said bottom, as from the upper portion of the shell of said reduced forward end portion, said bracing means extending over said spaced wheeled supports.

9. In a device of the character described, a tank body having front and rear heads and an upward offset in the under side thereof, and longitudinal bracing means for said tank comprising straight tubular members mounted in said tank body and inclined downwardly from the front to the rear end of said tank body and secured in the front and rear heads thereof, stiffening webs secured to the under side of said tubular members at the forward end of said tank and stiffening members secured only to the upper side of said tubular members at the rear end of said tank, and forming beams in cooperation with said tubular members.

10. A tank body having front and rear heads and provided with an upward offset in the under side thereof providing an inclined wall portion and a reduced forward end portion on said tank body, and longitudinal bracing means for said tank body comprising straight tubular members inclined downwardly from the front to the rear of said tank body and secured in the front and rear heads thereof, stiffening members secured to the under side of said tubular members and to the shell of said tank body at the forward end thereof and at said inclined wall portion, and stiffening members secured to the upper side of said tubular members rearwardly of said offset.

11. In a semi-trailer tank vehicle, a tank body having a reduced end portion to be supported on a pulling vehicle, providing an offset in the under side of said tank body, a running board extending lengthwise of said tank body and projecting laterally beyond said tank body and a skirting extending downwardly from said running board in spaced relation to said tank body.

12. The combination with a pulling vehicle of a semi-trailer tank vehicle comprising a tank body having a reduced end portion to provide an offset in the under side of said body wheels on said semi-trailer vehicle and a skirting on said semi-trailer vehicle having a substantially straight top edge portion and extending downwardly between the pulling vehicle and trailer wheels, and having a curved cut out portion in the bottom edge thereof adjacent said pulling vehicle wheels at the forward end of said skirting.

13. In a semi-trailer tank vehicle, a tank body having a reduced end portion to be supported on a pulling vehicle, providing an offset in the under side of said tank body, and a housing on said vehicle having a substantially straight top portion extending laterally from said tank body and a vertical wall extending downwardly from said top wall in spaced relation to said tank body, from a point forward of said offset in said tank body to a point adjacent the rear end of said tank body.

14. The combination with a pulling vehicle, of a semi-trailer tank vehicle comprising a tank body having an offset therein providing a reduced end portion on said tank body, a fifth wheel structure on said pulling vehicle supporting the reduced end portion of said tank body, and a skirting on said semi-trailer vehicle depending below the bottom of said reduced end portion on both sides of said tank body at said fifth wheel structure, said skirting having a portion depending below the bottom of said tank body at said offset.

15. The combination with a pulling vehicle, of a semi-trailer tank vehicle comprising a tank body having an offset therein providing a reduced end portion on said tank body, a fifth wheel structure on said pulling vehicle supporting the reduced end portion of said tank body, and a skirting on said semi-trailer vehicle depending below the bottom of said reduced end portion on both sides of said tank body at said fifth wheel structure, said skirting having a portion depending below the bottom of said tank body at said offset, to hide said offset and extending rearwardly from said offset a substantial distance.

16. The combination with a pulling vehicle, of a semi-trailer tank vehicle comprising a tank body having an offset therein providing a reduced end portion on said tank body, a fifth wheel structure on said pulling vehicle supporting the reduced end portion of said tank body, and a skirting on said semi-trailer vehicle depending below the bottom of said reduced end portion on both sides of said tank body at said fifth wheel structure, said skirting having a portion depending below the bottom of said tank body at said offset, and extending substantially to the rear end of said tank body, said skirting comprising a top portion of substantially uniform depth from end to end of said tank body and bottom portions depending below the bottom of said tank between a wheel of the pulling vehicle and a wheel of the trailer to enclose the space between said wheels at each side of said vehicle.

In testimony whereof, I hereunto subscribe my name this 19 day of April, 1930.

ANDREW A. KRAMER.